United States Patent
Miyoshi et al.

(10) Patent No.: US 10,233,039 B2
(45) Date of Patent: Mar. 19, 2019

(54) RAISING/LOWERING CONVEYANCE APPARATUS FOR ARTICLE CONVEYING CONTAINER WITH CONTAINER CONDITION SENSORS

(71) Applicant: Daifuku Co., Ltd., Osaka (JP)

(72) Inventors: Kazuhiko Miyoshi, Shiga (JP); Jun Hamaguchi, Shiga (JP); Masato Inaba, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/615,159

(22) Filed: Jun. 6, 2017

(65) Prior Publication Data
US 2017/0267469 A1    Sep. 21, 2017

Related U.S. Application Data

(63) Continuation of application No. PCT/JP2015/082379, filed on Nov. 18, 2015.

(30) Foreign Application Priority Data

Dec. 25, 2014    (JP) .................................. 2014-262251

(51) Int. Cl.
| | | |
|---|---|---|
| *B25J 15/04* | (2006.01) | |
| *B25J 15/02* | (2006.01) | |
| *B25J 13/08* | (2006.01) | |
| *B65G 63/02* | (2006.01) | |
| *B65G 63/00* | (2006.01) | |
| *B65G 1/04* | (2006.01) | |
| *B65G 1/14* | (2006.01) | |
| *B65G 43/00* | (2006.01) | |
| *B65G 61/00* | (2006.01) | |

(Continued)

(52) U.S. Cl.
CPC ............ *B65G 63/025* (2013.01); *B25J 13/08* (2013.01); *B65G 1/04* (2013.01); *B65G 1/0407* (2013.01);
(Continued)

(58) Field of Classification Search
CPC .. B65G 1/0464; B65G 1/0407; B65G 1/0421; B25J 9/1697
See application file for complete search history.

(56) References Cited

U.S. PATENT DOCUMENTS 3,558,176 A * 1/1971 Fathauer et al. ........ B66C 1/223
                                                        294/81.21
4,591,198 A * 5/1986 Monforte ............... B25J 13/082
                                                        294/119.1
(Continued)

FOREIGN PATENT DOCUMENTS

EP         0767113 A2 *  4/1997  .......... B25G 1/0464
JP         H06115608 A     4/1994
(Continued)

*Primary Examiner* — Gregory W Adams
(74) *Attorney, Agent, or Firm* — St. Onge Steward Johnston & Reens LLC

(57) ABSTRACT

A raising/lowering conveyance apparatus has at least two sets of container holders operable to be raised/lowered in conjunction with each other, and to be freely movable closer to or away from containers in the back-and-forth horizontal direction. A sensor operable to detect the upper end height of the transferred containers which have been transferred and raised is attached to a position near the lower end of each container holder, to determine abnormality in posture of the transferred containers through a comparison operation between the value of the upper end height of the transferred containers detected by the sensor and the normal value of the upper end height of the transferred containers calculated on the basis of the height of the container being handled.

6 Claims, 12 Drawing Sheets

(51) Int. Cl.
*B65G 47/90* (2006.01)
*B25J 9/02* (2006.01)

(52) U.S. Cl.
CPC ............ *B65G 1/14* (2013.01); *B65G 43/00* (2013.01); *B65G 61/00* (2013.01); *B65G 63/00* (2013.01); *B25J 9/026* (2013.01); *B25J 13/086* (2013.01); *B65G 47/901* (2013.01); *B65G 47/905* (2013.01); *Y10S 294/902* (2013.01); *Y10S 294/907* (2013.01); *Y10S 901/47* (2013.01)

(56) References Cited

U.S. PATENT DOCUMENTS

| | | | | |
|---|---|---|---|---|
| 5,560,663 | A * | 10/1996 | Hara | B66C 1/101 294/81.41 |
| 6,000,904 | A * | 12/1999 | Schlusselbauer | B65G 1/0464 294/81.52 |
| 6,654,662 | B1 * | 11/2003 | Hognaland | B65G 1/0464 700/214 |
| 7,329,081 | B2 * | 2/2008 | Baker | B65G 1/04 414/268 |
| 8,075,238 | B2 * | 12/2011 | Wirz | B65G 1/0407 294/119.1 |
| 8,498,745 | B2 * | 7/2013 | Umetsu | B25J 15/0009 318/568.16 |
| 2006/0056951 | A1 * | 3/2006 | Williamson | B65G 1/0464 414/626 |
| 2014/0067126 | A1 * | 3/2014 | Watanabe | B25J 9/1697 700/259 |

FOREIGN PATENT DOCUMENTS

| | | | | |
|---|---|---|---|---|
| JP | 2016003069 A | | 1/2016 | |
| WO | WO-2012127102 A1 | * | 9/2012 | ........... B25G 1/0464 |
| WO | WO-2013167907 A1 | * | 11/2013 | ........... B25G 1/0464 |

* cited by examiner

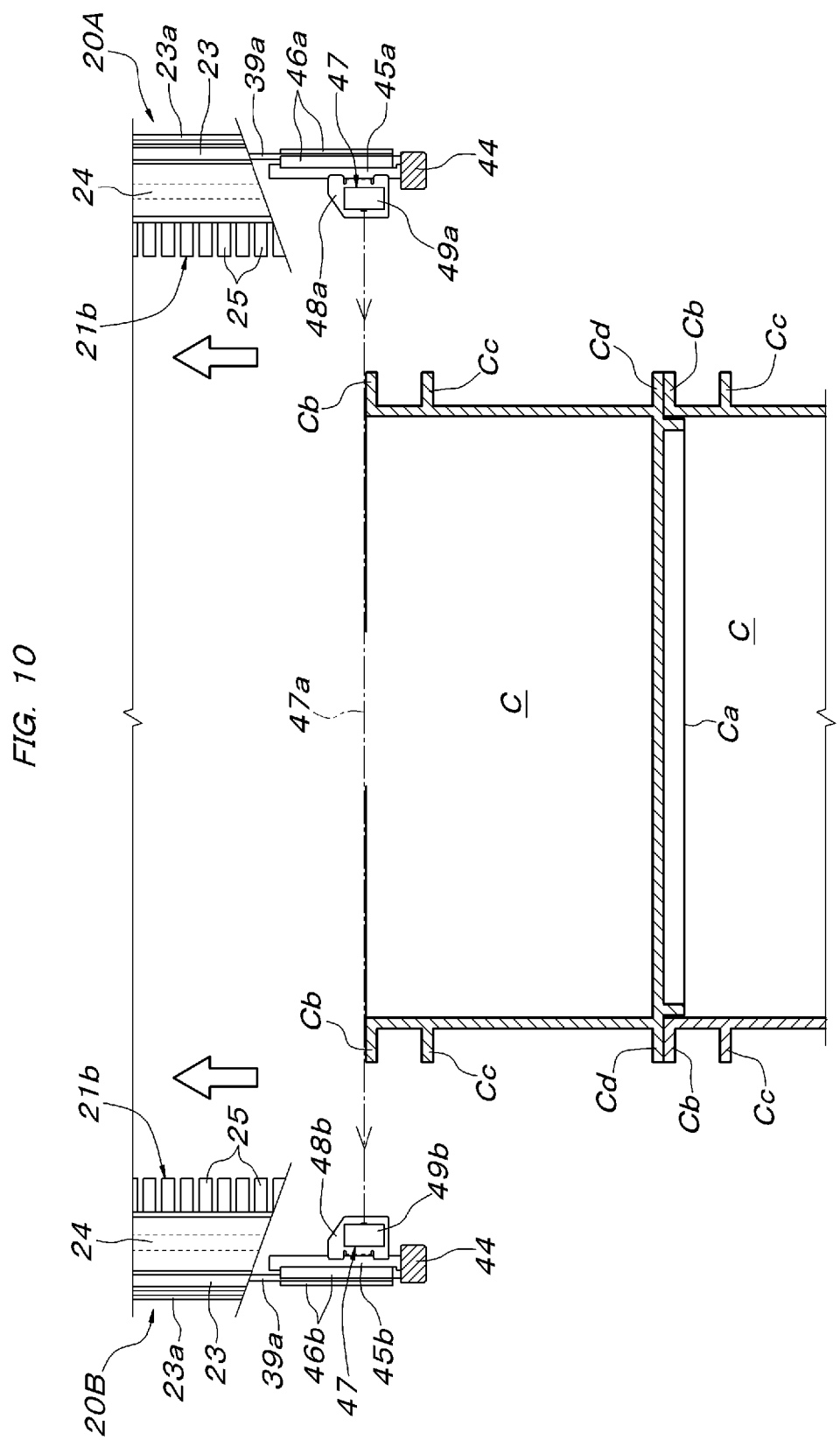

RAISING/LOWERING CONVEYANCE APPARATUS FOR ARTICLE CONVEYING CONTAINER WITH CONTAINER CONDITION SENSORS

FIELD OF THE INVENTION

The present invention relates to a raising/lowering conveyance apparatus for an article conveying container which includes at least two sets of container holding means that hold an article conveying container from both sides so as to raise/lower the container.

BACKGROUND OF THE INVENTION

As this type of an article conveying container, specifically, as a raising/lowering conveyance apparatus for a large container with an opening/closing door in a front surface, a raising/lowering conveyance apparatus is known in which as described in Japanese unexamined patent application publication No. H06-115608 (Patent Literature 1), a raising/lowering body that is suspended so as to be freely raised/lowered is provided in a ceiling traveling crane-type traveling body, and in which engaged hardware that is provided on the lower side of the raising/lowering body on the ceiling surface of the large container or a hook that is freely engaged and disengaged with and from a gap below the bottom surface of the large container is provided such that the large container can be suspended on the lower side of the raising/lowering body. In the configuration described in Japanese unexamined patent application publication No. H06-115608 (Patent Literature 1), it is a prerequisite that the engaged hardware dedicated to be suspended on the ceiling surface of the large container serving as a conveyed item be provided so as to project or that a gap be formed below the bottom surface of the large container, and thus a small container or the like which can be lifted and carried by both hands and which is made of plastic with an upper side opened cannot be utilized as it is as the conveyed item. In order to solve this problem, the present applicant has filed a patent application (Japanese patent application No. 2014-122242) on an invention which will be described below (hereinafter referred to as an unpublished patent application).

Specifically, in a container raising/lowering conveyance apparatus described in the unpublished patent application described above, a small container which can be lifted and carried by both hands and which is made of plastic with an upper side opened can be utilized as it is as a conveyed item, at least two sets of container holding means which raise/lower the small container by holding it from both sides are provided and these container holding means are raised/lowered in conjunction with each other and are configured so as to be freely movable closer to or away from the small container in a back-and-forth horizontal direction. Specifically, front and rear two sets of container holding means are provided so as to correspond to both front and rear sides of the small container, and both the container holding means include a holding tool which holds the side surface of the small container and a pair of left and right positioning tools which are freely movable closer to or away from each other in a left/right horizontal direction and which are fitted to both left and right corner portions of the side surface of the small container so as to position the small container. The small container to be handled includes: a projecting bottom portion which is fitted to the interior of an upper end opening portion of a lower small container at the time of container stacking; and a reinforcing rib that extends horizontally on both front and rear side surfaces of the small container held by the holding tool, and the holding tool includes a large number of pins which enter the lower side of the reinforcing ribs on both the front and rear side surfaces of the small container and which are freely advanceable and retractable.

SUMMARY OF THE INVENTION

A case is considered where the container raising/lowering conveyance apparatus described in the unpublished patent application as described above conveys the small container (hereinafter simply referred to as a container) configured as described above and stacks it in a predetermined position, and when between a lower transferred container to be stacked and an upper container to be stacked thereon, a displacement is produced which exceeds play in a horizontal direction between the projecting bottom portion and the upper end opening portion in both the upper and lower containers, as shown in FIG. 11B, the projecting bottom portion and the upper end opening portion in both the containers are not properly fitted to each other, with the result that the containers are stacked in such an unstable posture that the upper container inclines with respect to the lower transferred container. When such an irregular stacked state is left as it is, an inconvenient situation occurs in which the containers fall by the action of an external force such as a small vibration or in which when all or part of the stacked containers are subsequently conveyed out, proper holding action is not performed. As a matter of course, the above-described abnormal situation in which the container lowered in the predetermined position inclines occurs not only in a case where both upper and lower containers whose projecting bottom portion and upper end opening portion are fitted to each other are stacked, but also, for example, in a case where a container is lowered on foreign matter that is unexpectedly present on the support surface of the container such as a floor surface, with the result that a similar inconvenient situation may still be caused.

The present invention proposes a raising/lowering conveyance apparatus for an article conveying container which can solve the conventional problems described above, and in order to easily understand a relationship with an example which will be described later, reference symbols used in the description of the example are shown with parentheses. In a raising/lowering conveyance apparatus for an article conveying container (2) which includes at least two sets of container holding means (20A, 20B) that hold an article conveying container (C) from both sides so as to raise/lower the article conveying container (C) and in which the container holding means (20A, 20B) are raised/lowered in conjunction with each other and are freely movable closer to or away from the container (C) in a back-and-forth horizontal direction, a sensor (47) for detecting the upper end height of the transferred container (C) when the container (C) is raised after being transferred is attached to a position near a lower end of each of the container holding means (20A, 20B), and a comparison operation is performed between a detected value of the upper end height of the transferred container detected by the sensor (47) and a normal value of the upper end height of the transferred container calculated on the basis of a height of the container (C) that is handled so as to determine abnormality in posture of the transferred container (C).

The "container" referenced in the present invention includes not only a small container with its upper side opened which is formed of plastic and which will be described later in the example but also various types of containers which contain various types of articles in order to convey them and which have different shapes, structures, materials, sizes and the like such as a box shape and a dish shape and the like capable of being stacked, and the container holding means (20A, 20B) are configured so as to correspond to the shape and the structure of the "container."

In the raising/lowering conveyance apparatus for an article conveying container according to the present invention, in a case where the container held by the container holding means is lowered on a predetermined position, the container holding means are lowered to a height at which the held container is supported on a container support surface or on the lower transferred container, then the container holding means are opened, thus the container holding action is cancelled and then the container holding means in the opened state are raised to a height which is higher than at least the upper end of the transferred container, with the result that the operation proceeds to the subsequent container transfer operation. In the final step in which the container holding means in the opened state are raised to the height which is higher than at least the upper end of the transferred container, with the sensor switched to the activated state, it is possible to detect the upper end height of the transferred container. For example, the transmitted pulse of an encoder in conjunction with a motor which drives the container holding means so as to raise/lower them is counted and is used as information on the current height of the container holding means, and thus it is possible to obtain the detected value of the upper end height of the transferred container from the information on the current height of the container holding means when the upper end height detection signal of the container detected by the sensor is received. On the other hand, information on the height of the container handled with the container raising/lowering conveyance apparatus is previously set, and thus it is possible to obtain, from the set value, the height (the total height at the time of stacking) of the container transferred to a predetermined position as the normal value of the upper end height of the transferred container corresponding to the counted value of the transmitted pulse of an encoder in conjunction with the motor which drives the container holding means so as to raise/lower them. Hence, a difference between the normal value of the upper end height of the transferred container and the detected value of the upper end height of the transferred container is calculated, and thus it is possible to determine, when the difference falls within the set allowable range, that the stacking is normal whereas it is possible to determine, when the difference exceeds the set allowable range, that the stacking is abnormal.

Hence, in any case where the container conveyed with the raising/lowering conveyance apparatus for an article conveying container is lowered on the container transferred to the predetermined position and/or on the container support surface such as the floor, when the container lowered to the predetermined position is properly supported on the container support surface in a horizontal posture, since the height of the container (the total height at the time of stacking) is equal to the normal value of the upper end height of the transferred container capable of being previously acquired or an error within the allowable range, it is not determined that the stacking is abnormal. However, in a case where the projecting bottom portion of the container lowered to the predetermined position is not properly fitted into the upper end opening portion of the lower transferred container or in a case where it is lowered on foreign matter that is unexpectedly present on the container support surface, since the lowered container inclines such that the upper end height thereof exceeds the allowable range, it is determined that the stacking is abnormal. Although the control that is automatically performed on the basis of this determination of the abnormal stacking is not particularly limited, on the basis of this detection of the abnormal stacking, for example, the following control can be performed: the occurrence of abnormal stacking is notified by use of a lamp or a warning; all the subsequent storage and retrieval operations performed by the container raising/lowering conveyance apparatus 2 which detects this abnormal stacking is stopped; or only the stacking of another container on the transferred container to be detected for the abnormal stacking or only the carry-out operation thereof is stopped whereas the storage and retrieval operations on the container for another place are continued, etc.

As described in the unpublished patent application described previously, front and rear two sets of container holding means (20A, 20B) are provided so as to correspond to both front and rear sides of the container (C), both the container holding means (20A, 20B) include: holding tools (21b) which hold a side surface of the container; and a pair of left and right positioning tools (22a, 22b) which are freely movable closer to or away from each other in a laterally horizontal direction and which are fitted to both left and right corner portions of the side surface of the container so as to position the container (C) and the sensor (47) is formed with a light projector (49a) which is attached to a position near the holding tool (21b) of one of the container holding means (20A) and a light receiver (49b) which is attached to a position near the holding tool (21b) of the other container holding means (20B). In this configuration, as compared with a case where the container holding means are formed with four holding tools which move closer to or away from the four corners of the container in the horizontal direction, the sensor can be supported by the holding tools which perform only the raising/lowering movement in conjunction with each other without moving laterally in a laterally horizontal direction, with the result that it is possible to easily utilize the sensor formed with the light projector and the light receiver.

BRIEF DESCRIPTION OF THE DRAWINGS

FIG. 10 is a vertical side cross-sectional view showing a main portion illustrating the function of a sensor when the container raising/lowering conveyance apparatus is raised after the completion of the transfer of the container.

DETAILED DESCRIPTION OF THE INVENTION

Figure 1:
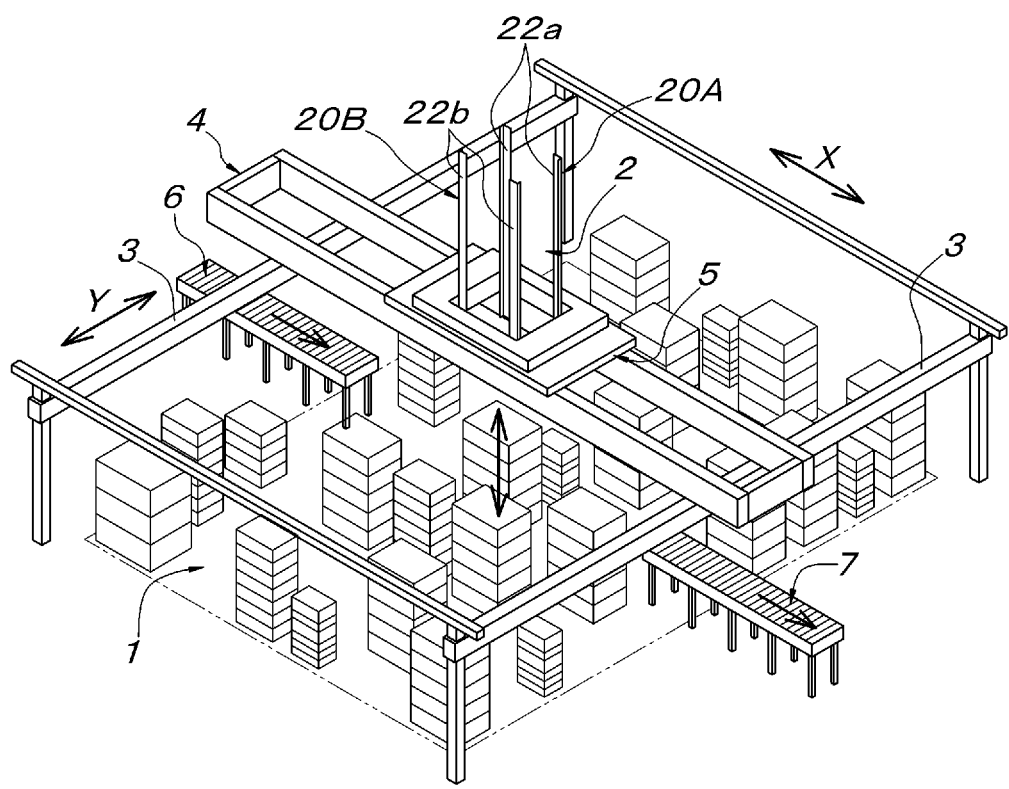
FIG. 1 is a perspective view showing the outline of an entire storage facility which utilizes a raising/lowering conveyance apparatus for an article conveying container (hereinafter shortly referred to as a container) according to the present invention.

In a storage facility shown in FIG. 1, a container raising/lowering conveyance apparatus 2 is placed over the upper portion of a horizontally rectangular planar container storage area 1. In the container storage area 1, a pair of front and rear guide rails 3 which are placed horizontally along both front and rear sides thereof, on the pair of front and rear guide rails 3, a horizontally long traveling body 4 which is freely movable horizontally in a Y-direction (left/right direction) is supported, on the traveling body 4, a carriage 5 which is freely movable horizontally in an X-direction (back-and-forth direction) is supported and the container raising/lowering conveyance apparatus 2 is supported on the carriage 5. Hence, the container raising/lowering conveyance apparatus 2 can be moved to an area directly above an arbitrary position within the container storage area 1 by the horizontal movement of the traveling body 4 in the Y-direction and the horizontal movement of the carriage 5 on the traveling body 4 in the X-direction. In the container storage area 1, a container carry-in conveyor 6 which carries a container from the outside of the container storage area 1 into the container storage area 1 and a container carry-out conveyor 7 which retrieves a container from the container storage area 1 to the outside of the container storage area 1 are additionally provided.

Figure 2:
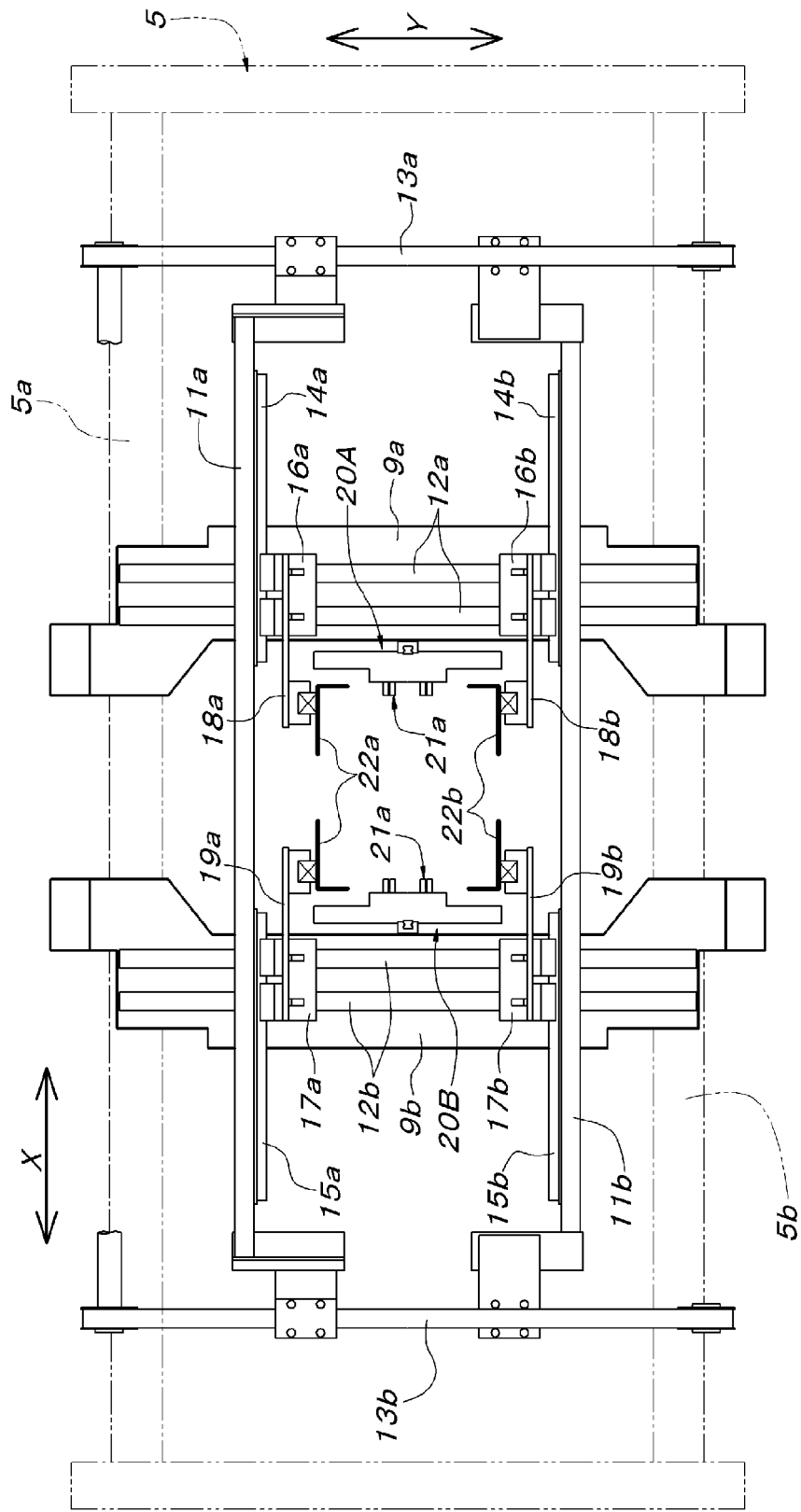
FIG. 2 is a plan view showing a Y-direction drive mechanism in the container raising/lowering conveyance apparatus.
Figure 3:
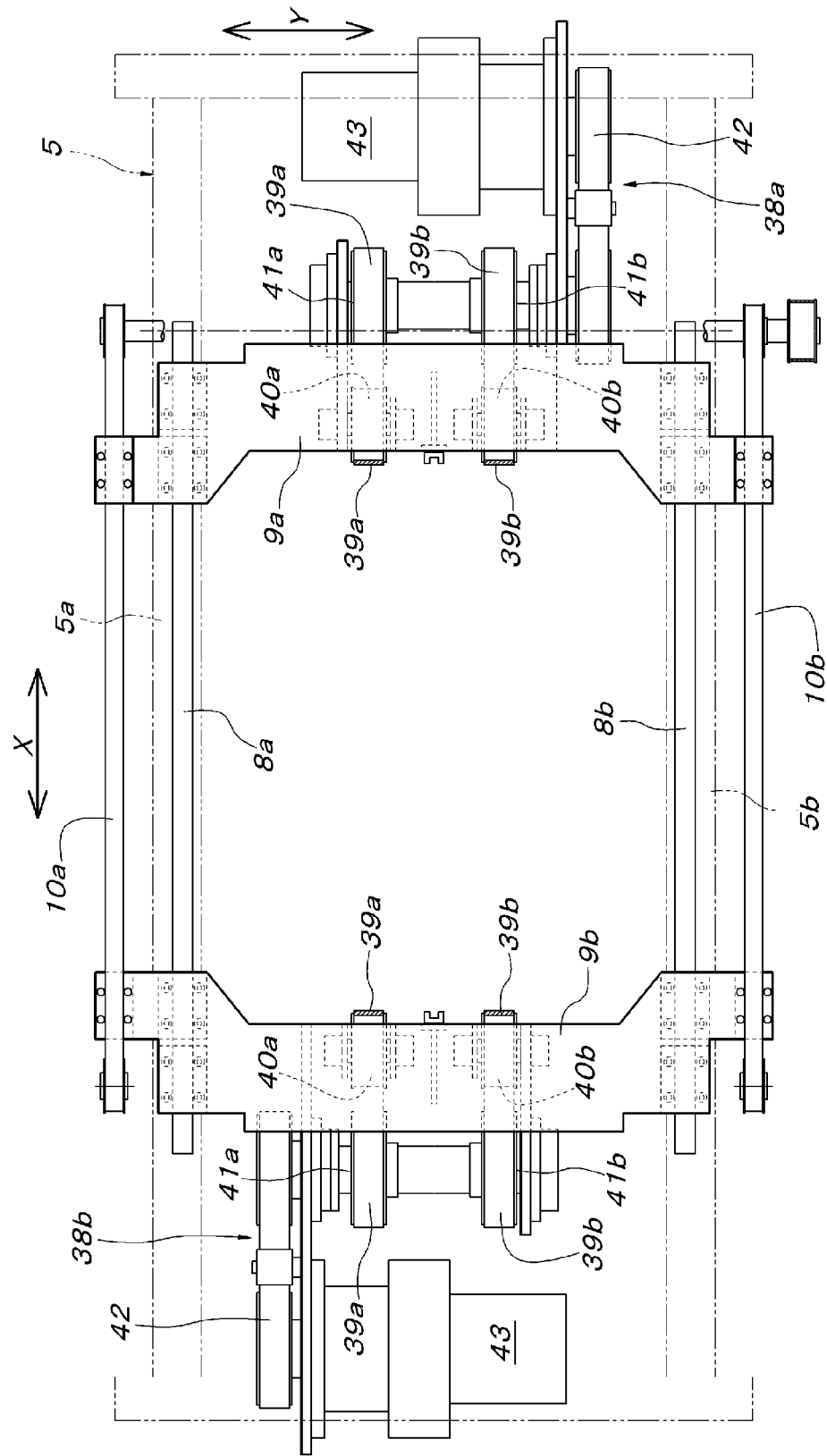
FIG. 3 is a plan view showing an X-direction drive mechanism in the container raising/lowering conveyance apparatus.
Figure 4:
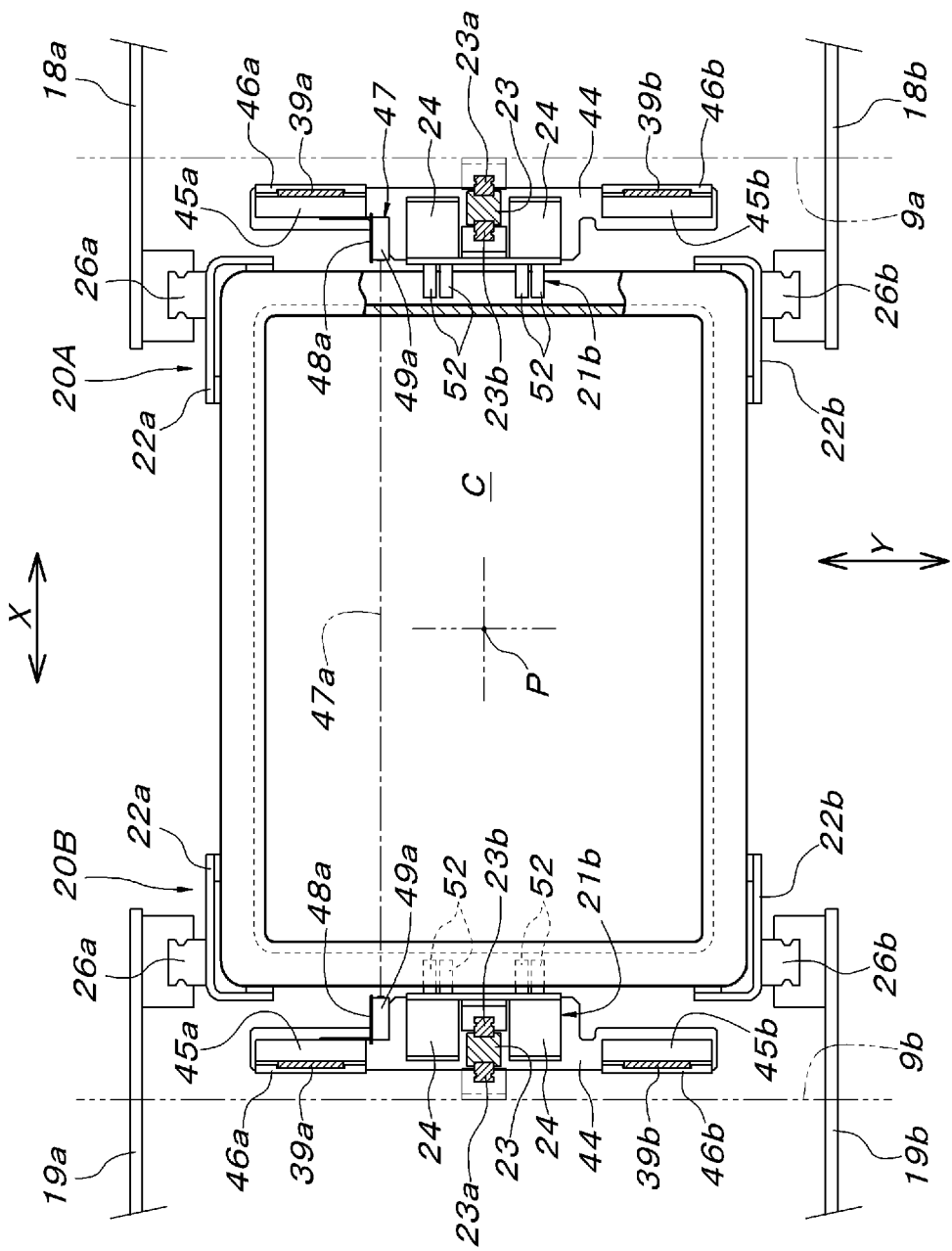
FIG. 4 is a partial cutout plan view showing a container-holding state of the container raising/lowering conveyance apparatus.

As shown in FIGS. 2 to 4, the planar surface of the carriage 5 is formed in the shape of a rectangular frame, on a Y-direction pair of side frames 5a and 5b, guide rails 8a and 8b parallel to the X-direction are installed and on the Y-direction pair of guide rails 8a and 8b, an X-direction pair of movable bases 9a and 9b whose both end portions are supported so as to be freely movable laterally in the X-direction are provided. In the side frames 5a and 5b of the carriage 5, in outer positions of the side frames 5a and 5b, X-direction driving endless belts 10a and 10b are stretched in parallel to the X-direction, a drive means which drives both the X-direction driving endless belts 10a and 10b so as to rotate them forward and in reverse in synchronization with each other is additionally provided, both the end portions of the movable base 9a on one side are coupled to an upper path portion which moves in the same direction as both the driving endless belts 10a and 10b and both the end portions of the movable base 9b on the other side are coupled to a lower path portion which moves in the direction opposite to the upper path portion of both the X-direction driving endless belts 10a and 10b. Hence, when both the X-direction driving endless belts 10a and 10b are driven by the drive means so as to rotate forward, the pair of movable bases 9a and 9b move closer to each other in the X-direction whereas when both the X-direction driving endless belts 10a and 10b are driven so as to rotate in reverse, the pair of movable bases 9a and 9b move away from each other in the X-direction.

On the X-direction pair of movable bases 9a and 9b, a Y-direction pair of movable side frames 11a and 11b in which the length in the X-direction is longer than the length of the reciprocating movement path of the movable bases 9a and 9b in the X-direction are supported on guide rails 12a and 12b installed on the movable bases 9a and 9b in parallel to the Y-direction so as to be freely movable parallel to the Y-direction. On the carriage 5, in outer positions of the both ends of the movable side frames 11a and 11b, Y-direction driving endless belts 13a and 13b are stretched in parallel to the Y-direction, a drive means which drives both the Y-direction driving endless belts 13a and 13b so as to rotate them forward and in reverse in synchronization with each other is provided on the carriage 5. Both the end portions of the movable side frame 11a on one side are coupled to an upper path portion which moves in the same direction as both the Y-direction driving endless belts 13a and 13b, and both the end portions of the movable side frame 11b on the other side are coupled to a lower path portion which moves in the direction opposite to the upper path portion of both the Y-direction driving endless belts 13a and 13b. Hence, when both the Y-direction driving endless belts 13a and 13b are driven by the drive means so as to rotate forward, the pair of movable side frames 11a and 11b move closer to each other in the Y-direction whereas when both the Y-direction driving endless belts 13a and 13b are driven so as to rotate in reverse, the pair of movable side frames 11a and 11b move away from each other in the Y-direction. Furthermore, on the inner sides of the respective movable side frames 11a and 11b, via guide rails 14a and 15a and 14b and 15b installed on the inner side of the movable side frames 11a and 11b, X-direction pairs of movable bodies 16a and 17a and 16b and 17b are supported, and support arms 18a to 19b which extend inward of the X-direction from the respective movable bodies 16a to 17b are provided.

Figure 7:
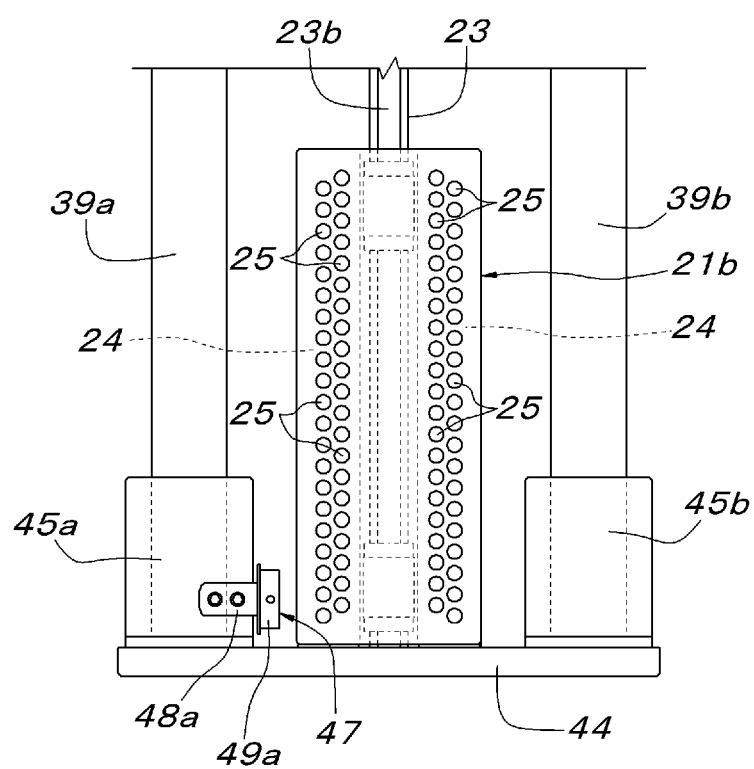
FIG. 7 is an elevational view when the lower holding tool of FIG. 6 is viewed from inside in the X-direction.
Figure 8:
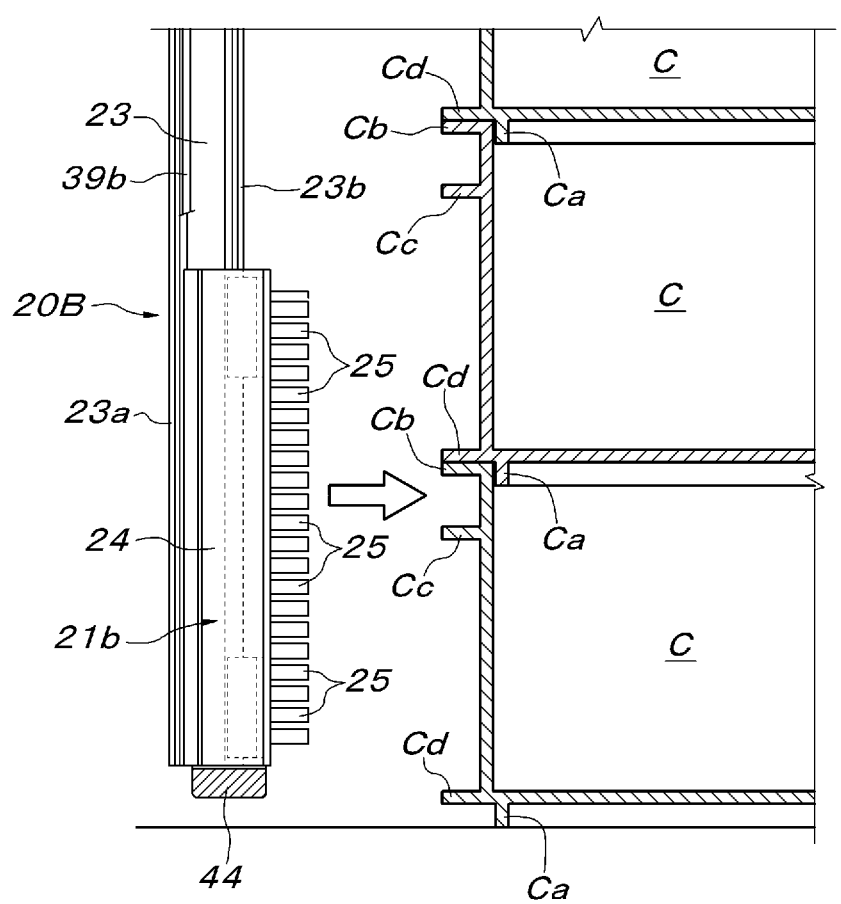
FIG. 8 is a vertical side cross-sectional view showing a state immediately before the container is lifted by the lower holding tool.

The container raising/lowering conveyance apparatus 2 includes an X-direction pair of container holding means 20A and 20B which are freely raised/lowered. Both the container holding means 20A and 20B include holding tools 21a and 21b in two vertically stacked layers which are located in the center in the Y-direction and a pair of positioning tools 22a and 22b which are located on both sides of the holding tools 21a and 21b in the Y-direction, and have a structure in which they are symmetrical with respect to each other. The respective holding tools 21a and 21b have the same structure in which they are supported so as to be individually and freely raised/lowered within a given range at a lower end and at an intermediate height of a raising/lowering columnar body 23 that is supported on the inner side of the movable bases 9a and 9b so as to be vertically and freely raised/lowered, and have a structure in which, as shown in FIGS. 4, 7 and 8, on a vertically long casing 24 which is externally fitted to the raising/lowering columnar body 23 and whose planar shape is laterally concave, a large number of advanceable and retractable pins 25 are provided so as to project. The respective pins 25 are aligned at equal intervals in the up/down direction in a state where at least two pins 25 are located at the same height laterally symmetrically, and are individually biased and supported with springs so as to project from the front surface of the vertically long casing 24 on the side where the container is held. As shown in FIG. 4, reference symbols 23a and 23b denote raising/lowering guide rails which are installed on both sides of the raising/lowering columnar body 23 in the X-direction along the length direction thereof, the raising/lowering columnar body 23 is supported via the raising/lowering guide rail 23a so as to be freely raised/lowered with respect to the movable bases 9a and 9b and the holding tools 21a and 21b in two vertically stacked layers are supported via the raising/lowering guide rail 23b so as to be freely raised/lowered with respect to the raising/lowering columnar body 23 within a given range.

Figure 5:
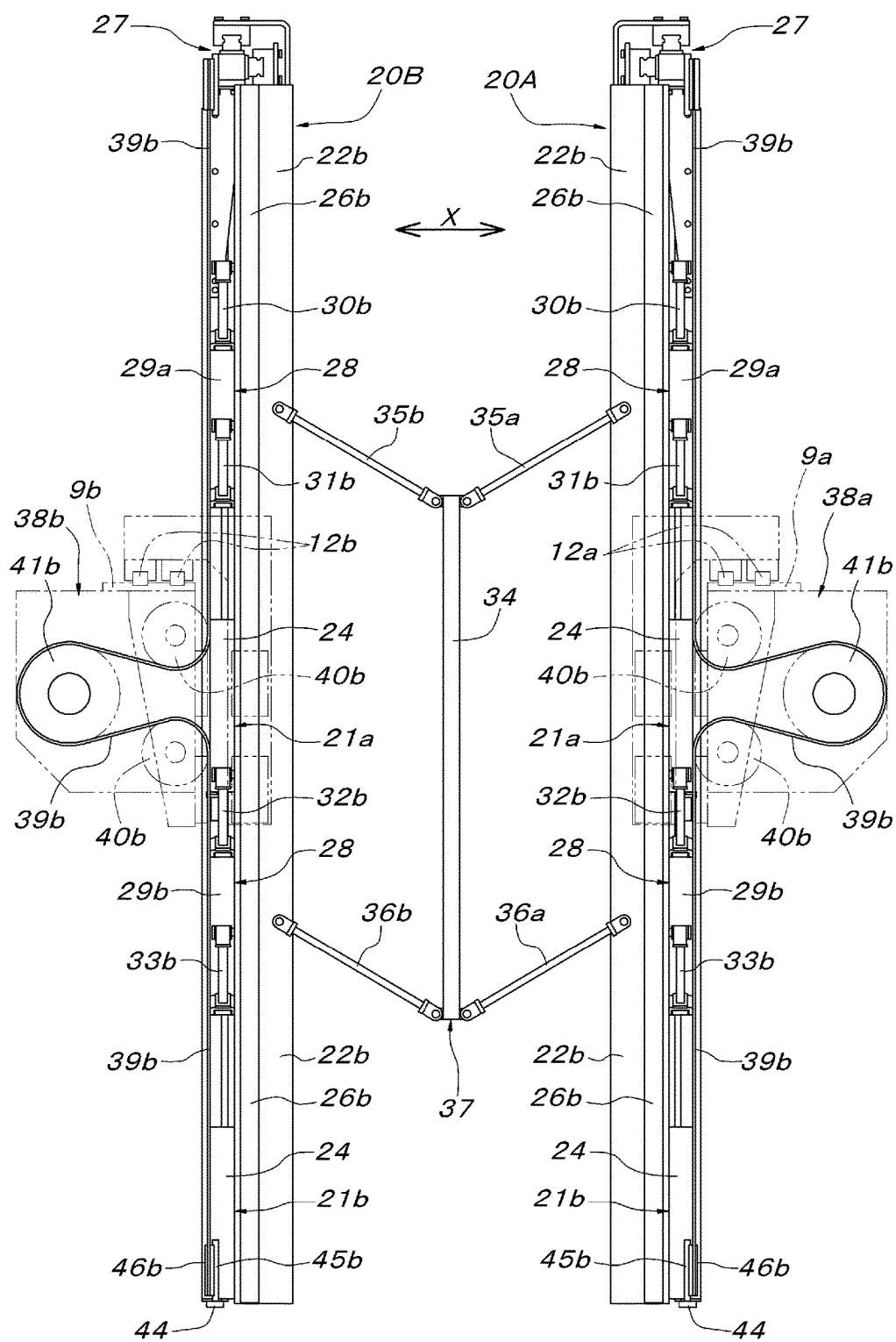
FIG. 5 is an elevational view when the main portion of the container raising/lowering conveyance apparatus is viewed from outside in a Y-direction.
Figure 6:
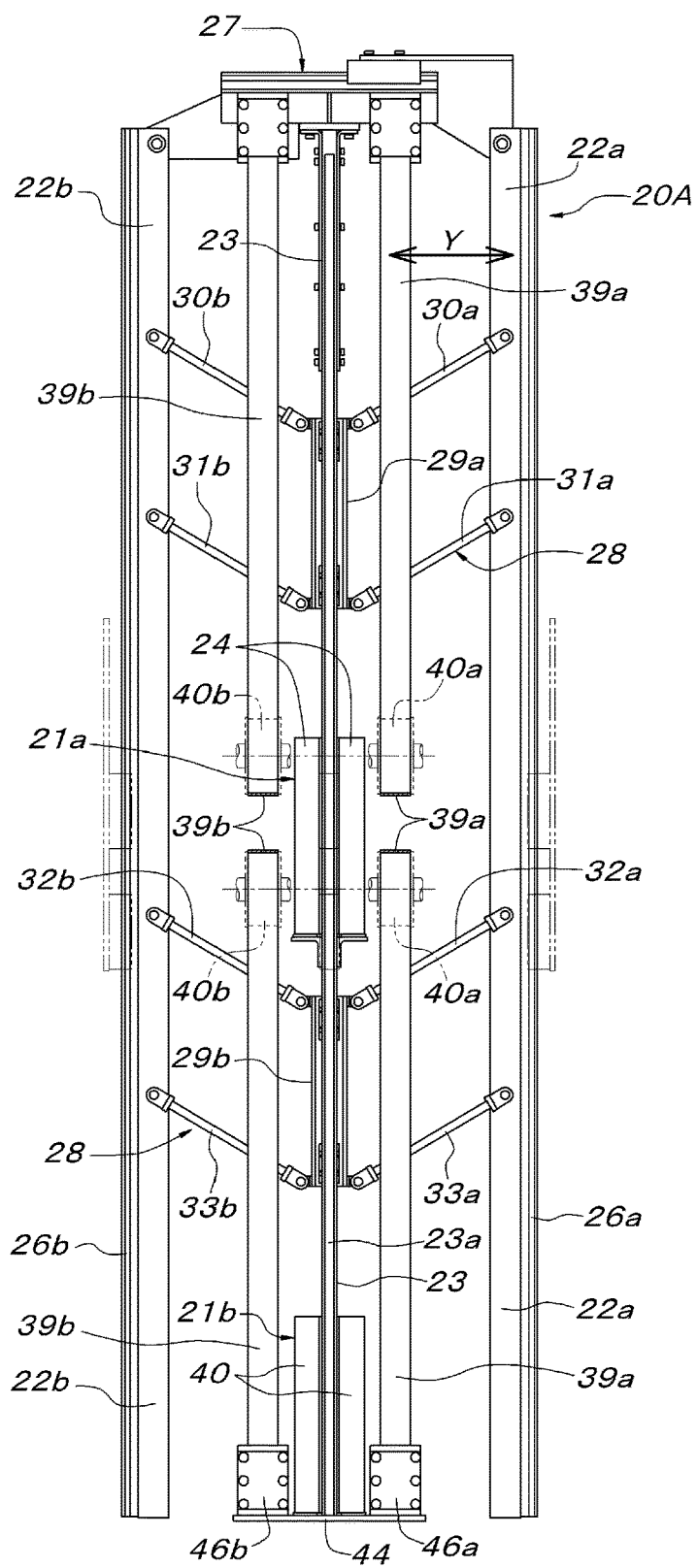
FIG. 6 is an elevational view when the main portion of the container raising/lowering conveyance apparatus is viewed from outside in an X-direction.

The Y-direction pair of positioning tools 22a and 22b whose lengths are substantially equal to the length of the raising/lowering columnar body 23 and whose lateral cross sections are symmetrical in the Y-direction and are formed in the shape of a letter L, and are supported on the support arms 18a to 19b located on the outer sides thereof via raising/lowering guide rails 26a and 26b that are additionally provided on the outer sides of the respective positioning tools 22a and 22b so as to be freely raised/lowered. As shown in FIG. 6, the Y-direction pair of positioning tools 22a and 22b are suspended from a support means 27 which is attached to the upper end portion of the raising/lowering columnar body 23 supporting the holding tools 21a and 21b and are coupled with each other by a coupling parallel link mechanism 28. The support means 27 allows both the positioning tools 22a and 22b to relatively move closer or away from each other in the Y-direction, and the coupling parallel link mechanism 28 is formed with: raising/lowering bodies 29a and 29b in two vertically stacked layers which are supported by the raising/lowering guide rail 23b installed on the raising/lowering columnar body 23 so as to be freely raised/lowered with respect to the raising/lowering columnar body 23; and parallel links 30a to 31b and 32a to 33b which couple both the upper and lower ends of the respective raising/lowering bodies 29a and 29b to two upper and lower portions of the respective positioning tools 22a and 22b. Furthermore, the X-direction pairs of positioning tools 22a, 22a and positioning tools 22b, 22b located on the same side of the container holding means 20A and 20B in the Y-direction are, as shown in FIG. 5, coupled with each other by a coupling parallel link mechanism 37 that is formed with: a center link member 34 which is located in the center therebetween and which is long in the up/down direction; and parallel links 35a to 36b which couple both the upper and lower ends of the center link member 34 to two upper and lower portions of the positioning tools 22a, 22a and 22b, 22b on both sides.

In the X-direction pair of movable bases 9a and 9b, raising/lowering drive means 38a and 38b are provided which raise/lower the container holding means 20A and 20B provided in the respective movable bases 9a and 9b. Both the raising/lowering drive means 38a and 38b have the same structure as each other, and are, as shown in FIGS. 3, 5 and 6, formed with: a Y-direction pair of fixed belts 39a and 39b whose both ends are fixed to both the upper and lower ends of the raising/lowering columnar body 23; a Y-direction pair of coaxial driving pulleys 41a and 41b over which on the lower side of the respective movable bases 9a and 9b, the respective fixed belts 39a and 39b that are drawn outward via a pair of upper and lower guide pulleys 40a and 40b are stretched; and a speed reducer equipped motor 43 which drives the coaxial driving pulleys 41a and 41b via a belt transmission means 42 so as to rotate them forward and in reverse. It is configured such that, with the speed reducer equipped motor 43, the Y-direction pair of coaxial driving pulleys 41a and 41b are driven so as to rotate them forward and in reverse, and thus the raising/lowering columnar body 23 is raised/lowered via the Y-direction pair of fixed belts 39a and 39b. With the raising/lowering movement of the raising/lowering columnar body 23, the holding tools 21a and 21b supported on the raising/lowering columnar body 23 and the Y-direction pair of positioning tools 22a and 22b suspended via the support means 27 on the upper end of the raising/lowering columnar body 23 move to raise/lower together.

The respective container holding means 20A and 20B which moves to raise/lower by the raising/lowering drive means 38a and 38b with respect to the respective movable bases 9a and 9b as described above are symmetrically moved closer to or away from each other by rotating the X-direction driving endless belts 10a and 10b shown in FIG. 3 forward and in reverse, and furthermore, the Y-direction pair of positioning tools 22a and 22b in the respective container holding means 20A and 20B can be symmetrically moved closer to or away from each other in the Y-direction by rotating the Y-direction driving endless belts 13a and 13b shown in FIG. 2 forward and in reverse. The movements described above can be performed either individually or simultaneously.

As shown in FIGS. 4 and 7, in order to attach the Y-direction pair of fixed belts 39a and 39b to the lower end portion of the raising/lowering columnar body 23, a horizontal member 44 in which the lower end of the raising/lowering columnar body 23 is fixedly attached to the center thereof and belt attaching base plates 45a and 45b which are fixedly attached on both the end portions of the horizontal member 44 in the Y-direction are used, and thus the lower end portions of the respective fixed belts 39a and 39b are fixed to the belt attaching base plates 45a and 45b via belt attaching members 46a and 46b. A photoelectric sensor 47 for detecting the upper end height of the transferred container is attached to the belt attaching base plate 45a on the side of the container holding means 20A and the belt attaching base plate 45a on the side of the container holding means 20B which are located symmetrically in the X-direction among the belt attaching base plates 45a and 45b such that its optical axis is parallel to the X-direction. The photoelectric sensor 47 is formed with a light projector 49a and a light receiver 49b which are attached via brackets 48a and 48b.

In the storage facility configured as described above, a container C which is carried into the container storage area 1 with the container carry-in conveyor 6 is put into storage and kept in an arbitrary position within the container storage area 1 or conversely, the container C which is kept in an arbitrary position within the container storage area 1 is lowered on the container carry-out conveyor 7 and can be carried out of the container storage area 1 with the container carry-out conveyor 7. Specifically, the container raising/lowering conveyance apparatus 2 on the carriage 5 is located directly above the lifting/lowering operation position of the container C in the container storage area 1 by the traveling of the traveling body 4 in the Y-direction and the traveling of the carriage 5 on the traveling body 4 in the X-direction, and thereafter, lifting/lowering operation of the container C is performed by the container lifting/lowering operation of the container raising/lowering conveyance apparatus 2.

The container lifting operation of the container raising/lowering conveyance apparatus 2 will be described below. Although first, the container raising/lowering conveyance apparatus 2 in a state where the container holding means 20A and 20B are lifted to the standby position of a raising limit is moved to an area directly above the storage position of the container C to be retrieved, during the movement, until an imaginary rectangle on a plane connecting the four positioning tools 22a and 22b in the container holding means 20A and 20B is slightly larger than the planar size of the container C to be retrieved, the container holding means 20A and 20B are moved closer to each other in the X-direction, and the positioning tools 22a and 22b in the respective container holding means 20A and 20B are moved closer to each other in the Y-direction. Then, when the container raising/lowering conveyance apparatus 2 reaches the area directly above the storage position of the container C to be retrieved, the center position of the rectangle surrounded by the four positioning tools 22a and 22b substantially coincides, in plain view, with the center position P (see FIG. 4) of the container C to be retrieved. In such a state, as described previously, the raising/lowering drive means 38a and 38b are activated, and thus the container holding means 20A and 20B are lowered to the bottom surface height of the container C to be retrieved (such as a single container placed on the floor surface of the container storage area 1 or all stacked containers or a specific container at an arbitrary height within the stacked containers). As shown in FIGS. 4 and 7, the container C includes, in its bottom surface, a projecting bottom portion Ca which is fitted into the upper end opening portion of the lower container C at the time of stacking, and is a container in which reinforcing ribs Cb to Cd extending horizontally are integrally formed at both the upper and lower ends of a peripheral wall portion and at an intermediate height closer to the upper end so as to be continuous around the entire periphery, whose planar shape is formed in the shape of a plastic box with the upper side of its rectangle opened and which has a general portable size.

As shown in FIG. 8, both the container holding means 20A and 20B are lowered to a predetermined height, and then the X-direction driving endless belts 10a and 10b are driven to rotate in a direction in which both the container holding means 20A and 20B move closer to each other in the X-direction, and the Y-direction driving endless belts 13a and 13b are driven to rotate in a direction in which the Y-direction pair of positioning tools 22a and 22b in the respective container holding means 20A and 20B move closer to each other in the Y-direction. Consequently, as shown in FIG. 4, the holding tools 21a and 21b in both the container holding means 20A and 20B sandwich the container C to be retrieved from both sides in the X-direction, and the four positioning tools 22a and 22b are externally fitted to the four corner portions of the container C. When the positioning tools 22a and 22b make contact with the side surface (specifically, the peripheral edge of the reinforcing ribs Cb to Cd) of the respective corner portions of the container C, as shown in FIG. 9A, the respective holding tools 21a and 21b are in a position where the front surface of the vertically long casing 24 is close to the outer surface (specifically, the peripheral edge of the reinforcing ribs Cb to Cd) of the container C, the pins 25 located vertically away from the reinforcing ribs Cb to Cd among the pins 25 of the respective holding tools 21a and 21b enter, as they are, the interior of the space between the reinforcing ribs Cb to Cd adjacent vertically and the pins 25 which overlap the reinforcing ribs Cb to Cd retract into the vertically long casing 24, against the biasing force of the springs biasing the pins 25. Although the lower holding tool 21b of the holding tools 21a and 21b in two vertically stacked layers constantly operates, the upper holding tool 21a operates only when containers C stacked in a plurality of layers are targets to be retrieved and the total height thereof is higher than the distance between the holding tools 21a and 21b in two vertically stacked layers.

Figure 9B:
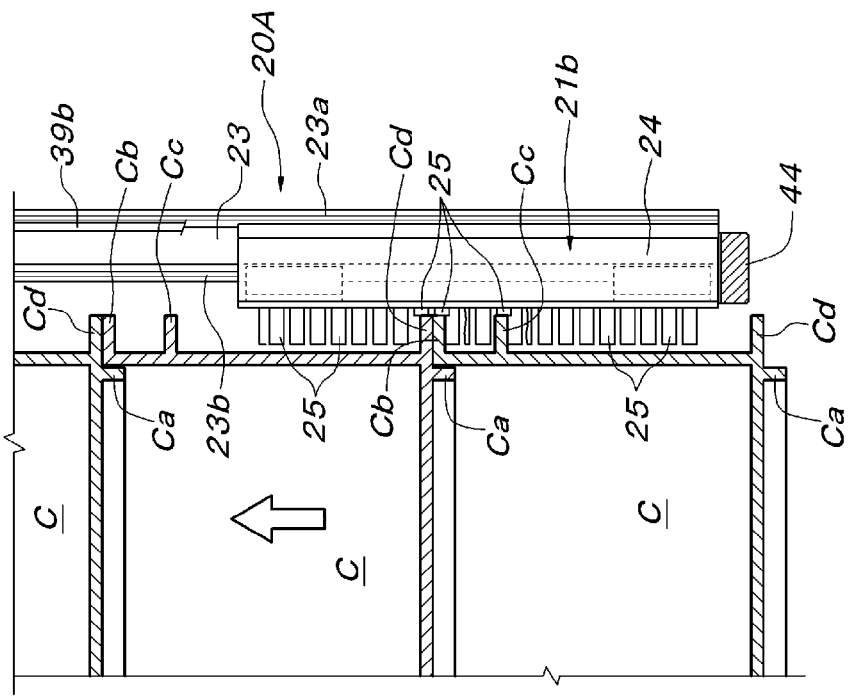
FIG. 9B is a vertical side cross-sectional view showing a second stage thereof.
Figure 9A:
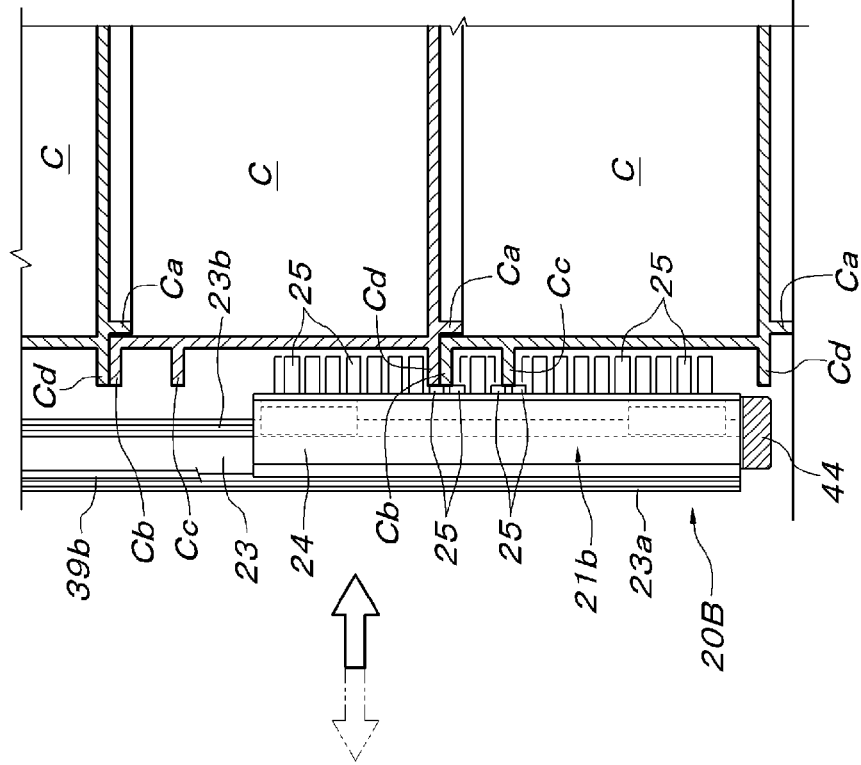
FIG. 9A is a vertical side cross-sectional view showing a first stage of an operation of lifting the container with the lower holding tool.

Then, both the container holding means 20A and 20B in a container-holding state as shown in FIG. 9A are raised to the height of the raising limit by activating the raising/lowering drive means 38a and 38b, and thus, as shown in FIG. 9B, the container C to be removed can be lifted vertically upward via at least one of the reinforcing ribs Cb and Cc with the pins 25 (two pins 25 which are located symmetrically in the Y-direction so as to correspond to the center position of the side surface of the container parallel to the Y-direction) which enter an area directly below the reinforcing ribs Cb and Cc of at least the lower holding tool 21b of the holding tools 21a and 21b in two vertically stacked layers on both sides in the X-direction. Thereafter, the container raising/lowering conveyance apparatus 2 which lifts the container C is moved to a position above the container carry-out conveyor 7 by the traveling of the traveling body 4 in the Y-direction and the traveling of the carriage 5 on the traveling body 4 in the X-direction, and then the container lowering operation described below is performed, with the result that it is possible to lower the suspended container C on the container carry-out conveyor 7.

The container lowering operation will then be described. The container raising/lowering conveyance apparatus 2 in which a container C to be stored that is sent into the container storage area 1 with the container carry-in conveyor 6 is held with the container holding means 20A and 20B of the container raising/lowering conveyance apparatus 2 by the container lifting operation described above, and is raised to the height of the raising limit, and thereafter, the container raising/lowering conveyance apparatus 2 which lifts the container C is moved to a storage target position within the container storage area 1 by the traveling of the traveling body 4 in the Y-direction and the traveling of the carriage 5 on the traveling body 4 in the X-direction. The actual size (the actual size of the entire height in a case where containers are stacked) of the container C to be stored which is handled at this time is automatically input as part of storage control data such as by reading it from a database of handled containers before the storage operation is performed. Hence, since at the time of stacking storage operation shown in FIG. 11A, the value of the height of a stored container Cx on which the container C is stacked can also be acquired from a storage state database, the value of the height of the container C to be stored that is newly stored and stacked is added to the value of the height of the stored container Cx, and thus the normal value of the height of the entire transferred containers C after the completion of the storage is determined and is automatically input as part of the storage control data. In this way, before the start of the storage operation, the normal value of the upper end height of the transferred containers C at the time of the completion of the storage is automatically set as part of automatic control data on a storage operation to be started (step S1 in FIG. 12).

Figures 11A, 11B:
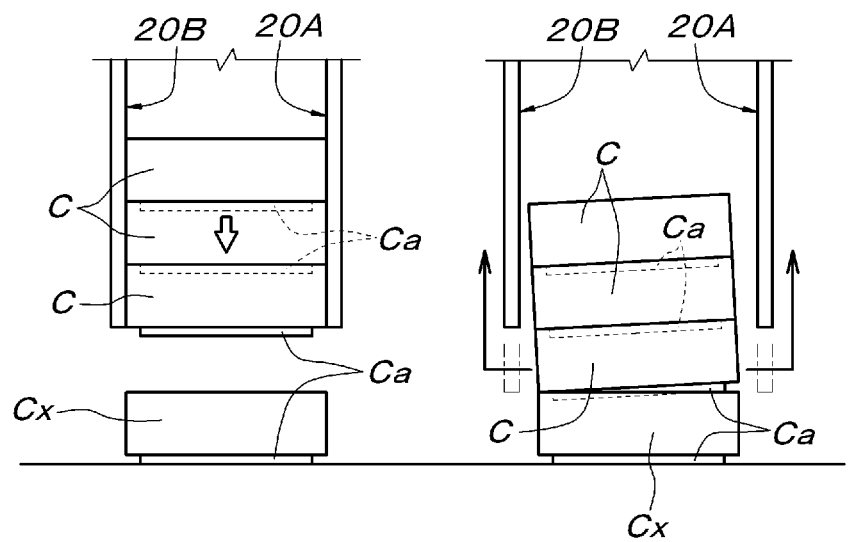
FIG. 11A is a side view showing a state in the middle of transfer in the stacking of the containers.
FIG. 11B is a side view showing a state of abnormal stacking when the stacking of the containers is completed.

When the container raising/lowering conveyance apparatus 2 which lifts the container C directly above the storage target position within the container storage area 1 stops, the raising/lowering drive means 38a and 38b are activated to lower the container holding means 20A and 20B holding the container C to be stored, and thus the container C to be stored is lowered on the storage target position within the container storage area 1. However, in a case where the container C to be stored is directly lowered on the floor surface within the container storage area 1, the container holding means 20A and 20B are lowered to a height slightly lower than a height at which the projecting bottom portion Ca of the container C to be stored held by the container holding means 20A and 20B reaches the floor. In a case where, as shown in FIG. 11A, the container C to be stored is lowered and stacked on the stored container Cx which has already been put into storage and kept, the projecting bottom portion Ca of the container C to be stored held by the container holding means 20A and 20B is fitted into the upper end opening portion of the stored container Cx, and thus the container holding means 20A and 20B are lowered to a height slightly lower than a height at which the lowermost reinforcing rib Cd is placed on the uppermost reinforcing rib Cb of the container C to be stored. When the container holding means 20A and 20B are lowered to the predetermined height and the lowering is stopped, reverse to the container lifting operation, the X-direction driving endless belts 10a and 10b and the Y-direction driving endless belts 13a and 13b are rotated in the reverse direction such that the X-direction pair of holding tools 21a and 21b move away from both the X-direction side surfaces of the container C to be stored, and the four positioning tools 22a and 22b move away from the four corner portions of the container C to be stored in the X-direction and the Y-direction such that the container holding means 20A and 20B are separated in the horizontal direction from the container C to be stored, with the result that the holding action is cancelled.

After the completion of the cancellation of the holding action described above, the raising/lowering drive means 38a and 38b are activated to raise the container raising/lowering conveyance apparatus 2 (the container holding means 20A and 20B) to the upper limit height, and thus the operation of lowering the container C to be stored is completed. However, when, after the cancellation of the holding action, the raising of the container holding means 20A and 20B is started (step S2 in FIG. 12), the photoelectric sensor 47 attached to the container holding means 20A and 20B is set to an operating state (step S3 in FIG. 12), and thus it is possible to detect the upper end height of the transferred container (container to be stored) C with the photoelectric sensor 47.

Specifically, a pulse encoder which is coupled in conjunction with, for example, the speed reducer equipped motor 43 of the raising/lowering drive means 38a and 38b that drive the container holding means 20A and 20B so as to raise/lower them and a counting means which adds its transmitted pulse while rising and which subtracts the pulse while lowering are utilized, and thus it is possible to obtain the value of the current height of the container holding means 20A and 20B with respect to a set reference height (for example, the lower limit height or the upper limit height of the container holding means 20A and 20B) to which the counted value is reset. On the other hand, since the photoelectric sensor 47 is in an intermediate position of the Y-direction pair of positioning tools 22a and 22b and is in a position near the lower end of the container holding means 20A and 20B, and the optical axis 47a between the light projector 49a and the light receiver 49b passes horizontally in the X-direction, the photoelectric sensor 47 is in an OFF-state while the transferred container C is present in a position where it overlaps the optical axis 47a. When as shown in FIG. 9, the container holding means 20A and 20B are raised, and thus the optical axis 47a of the photoelectric sensor 47 passes the upper end of the transferred container C upward, the light receiver 49b is brought into a light reception state, and thus the photoelectric sensor 47 is switched to an ON-state (step S4 in FIG. 12). Hence, the counted value (information on the current height of the container holding means 20A and 20B) of the transmitted pulse when the sensor 47 is switched from the OFF-state to the ON-state is read as the detected value of the upper end height of the transferred container C (step S5 in FIG. 12).

Figure 12:
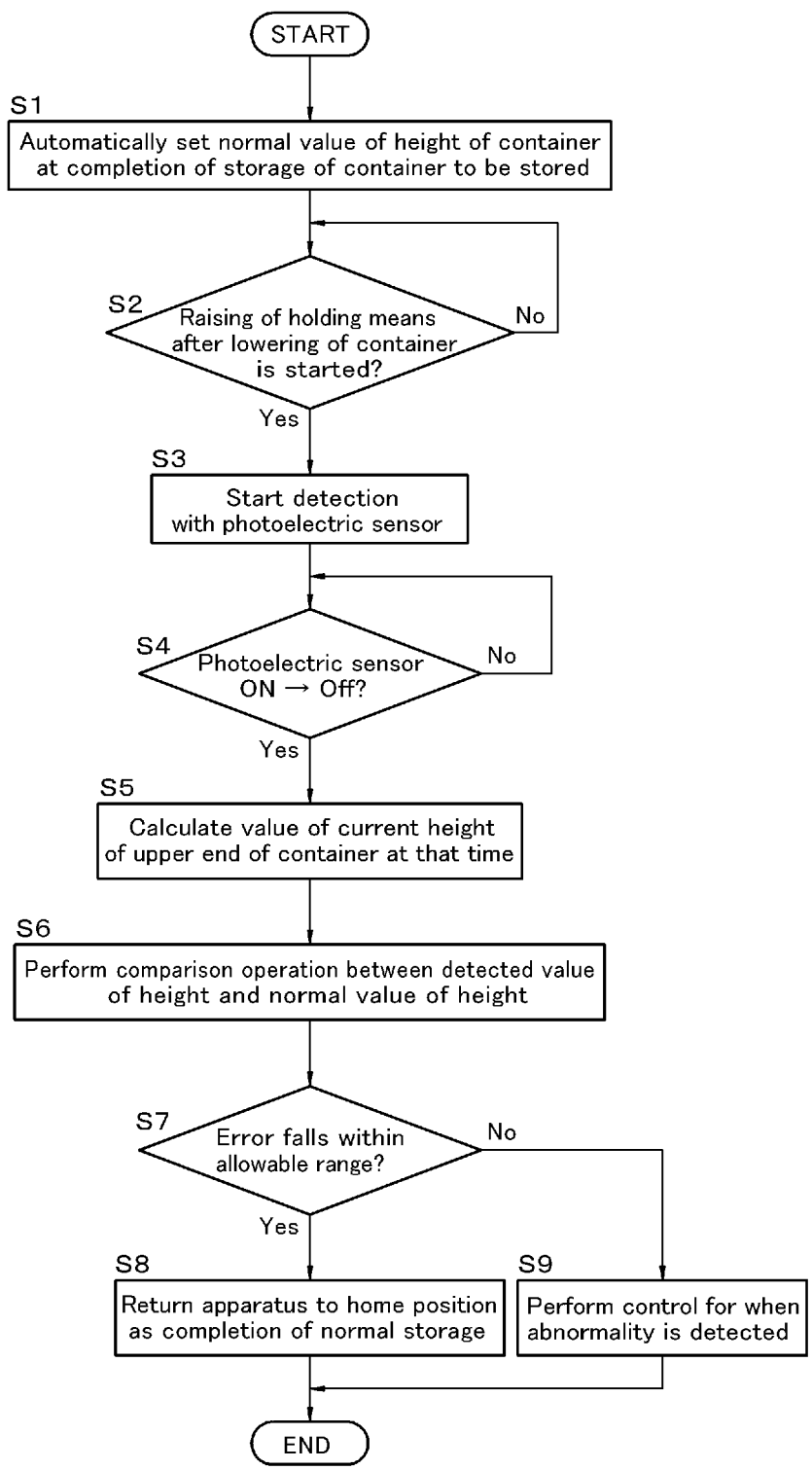
FIG. 12 is a flowchart illustrating the flow of a control system.

On the detected value of the upper end height of the transferred container detected by utilization of the photoelectric sensor 47, a comparison operation with the normal value of the upper end height of the transferred container set before the start of the storage operation is performed so as to determine a difference between both values (step S6 in FIG. 12). When a comparison operation is performed between the difference and a previously set threshold value (step S7 in FIG. 12), and when the difference thereof falls within an allowable range, it is possible to determine that entire posture of the transferred container C after the completion of the storage is normal, with the result that, on the basis of the normal determination, it is possible to proceed to the subsequent operation (step S8 in FIG. 12).

Figures 11C, 11D:
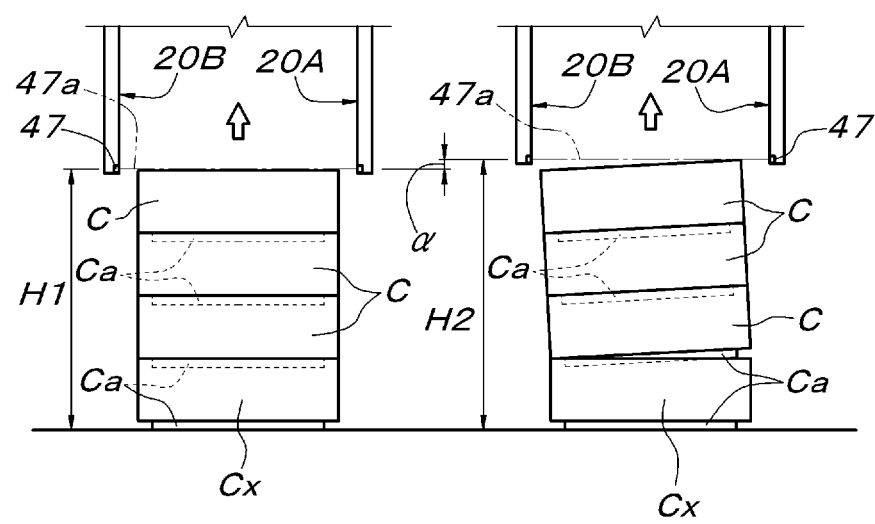
FIG. 11C is a side view showing a state when normal stacking is completed and FIG. 11D is a side view showing a state when abnormal stacking is detected.

However, when, at the time of the stacking storage operation shown in FIG. 11A, the projecting bottom portion Ca of the container C to be stored is not completely fitted into the upper end opening portion of the stored container Cx on which the container C is stacked, and as shown in FIG. 11B, the storage operation is completed in a state where part of the projecting bottom portion Ca of the container C to be stored is caught in part of the peripheral edge of the upper end opening portion of the stored container Cx, as shown in FIG. 11D, the upper end of the transferred container C when the storage is completed is not horizontal but inclines. Hence, a height when the optical axis 47a of the photoelectric sensor 47 is separated upward from the inclined upper end of the transferred container C, that is, the detected value H2 of the upper end height of the transferred container detected with the photoelectric sensor 47, is increased only by an error a as compared with the detected value H1 of the upper end height of the transferred container detected with the photoelectric sensor 47 when the normal stacking storage is completed as shown in FIG. 11C. Since the error a naturally exceeds the allowable range described previously, the entire posture of the transferred container C after the completion of the storage is determined to be abnormal, with the result that control on the basis of the abnormal determination, that is, various types of control which can be considered and which are described previously are started (step S9 in FIG. 12).

Although the abnormality at the time of stacking is described, in both cases where a single container C is directly transferred onto the floor surface of the container storage area 1, and where foreign matter is unexpectedly present onto the floor surface to which the container is transferred, since the projecting bottom portion Ca of the container C to be transferred rides the foreign matter, the container C inclines and hence the uppermost height of the container C is increased, the detected value of the upper end height of the transferred container detected by utilization of the photoelectric sensor 47 is increased, with the result that it is possible to determine abnormality in posture of the transferred container C. Although as the photoelectric sensor 47, a transmission-type photoelectric sensor formed with the light projector 49a and the light receiver 49b is used, depending on the case, it is also possible to use a reflection-type photoelectric sensor. In this case, the reflection-type photoelectric sensor is attached to each of the positions of the light projector 49a and the light receiver 49b, the upper ends heights of both the side surfaces of the container are detected with both the reflection-type photoelectric sensors and thus it is possible to determine the inclination of the container from an error in the detected height, or it is also possible to determine the inclination of the container from a time difference between the times when the ON-state is switched to the OFF-state in both the reflection-type photoelectric sensors.

Since in the example described above, it is configured such that the optical axis 47a of the photoelectric sensor 47 is parallel to the X-direction, in a case where the upper end of the container inclines with respect to the X-direction, an error in the detected value of the upper end height of the transferred container with respect to the normal value of the upper end height of the transferred container is increased whereas in a case where the upper end of the container inclines with respect to the Y-direction, the error is decreased. With consideration given to this point, the allowable range (threshold value) of the error with respect to the normal value needs to be set. However, in a case where the containers are stacked, since the lowermost reinforcing rib Cd in the upper container is received by the uppermost reinforcing rib Cb in the lower container without fail, the upper end height of the container at the time of abnormal stacking does not become lower than the upper end height of the container at the time of normal stacking, with the result that it is possible to achieve the objective by configuring such that either inclination with respect to the X-direction or inclination with respect to the Y-direction can be detected.

Furthermore, the raising/lowering conveyance apparatus for an article conveying container according to the present invention can be utilized as a means in which it is installed beside a conveyor line for conveying an article conveying container such as a container and in which the article conveying container is transferred onto the conveyor line, a means in which another article conveying container is stacked on the article conveying container conveyed on the conveyor line and the like.

The raising/lowering conveyance apparatus for an article conveying container according to the present invention can be effectively utilized, in the storage facility of an article conveying container such as a container, in particular, as a storage and retrieval operations means for an article conveying container that can automatically detect whether or not article conveying containers are normally stacked at the time of storage.

What is claimed is:

1. A raising/lowering conveyance apparatus for an article conveying container, comprising:
   at least two sets of container holders operable to hold an article conveying container from both sides so as to raise/lower the article conveying container, the container holders being operable to be raised/lowered in conjunction with each other and to be freely movable closer to or away from the container in a back-and-forth horizontal direction;
   a sensor comprising a light projector attached to a lower end of one of the at least two sets of container holders and a light receiver attached to a lower end of another of the at least two sets of container holders, the sensor being operable to detect an upper end height of a transferred container when the sensor clears an upper end of the transferred container and the light receiver receives a light emitted by the light projector; and
   wherein the conveyance apparatus is operable to determine an abnormality in a position of the transferred container by comparing a detected value of the upper end height of the transferred container, as detected by the sensor, with an expected value of the upper end height of the transferred container calculated on the basis of a height of the container that is handled.

2. The raising/lowering conveyance apparatus for an article conveying container according to claim 1, wherein:
   front and rear sets of container holders are provided so as to correspond to front and rear sides of the container;
   the front and rear sets of container holders include holding tools which hold a side surface of the container, and a pair of left and right positioning tools which are freely movable closer to or away from each other in a laterally horizontal direction and which are fitted to left and right corner portions of a side surface of the container so as to position the container; and
   the light projector of the sensor is attached to a position near the holding tool of one of the sets of container holders and the light receiver of the sensor is attached to a position near the holding tool of the other set of container holders.

3. A raising/lowering conveyance apparatus for an article conveying container, comprising:
   at least two sets of container holders to hold an article conveying container from both sides so as to raise/lower the article conveying container, the container holders being operable to be raised/lowered in conjunction with each other and to be freely movable closer to or away from the container in a back-and-forth horizontal direction;
   a sensor comprising reflection-type photoelectric receptors attached to a lower end of each of the at least two sets of container holders, the sensor being operable to detect an upper end height of a transferred container when the sensor clears an upper end of the transferred container and the reflection-type photoelectric receptors stop receiving light reflected from the transferred container; and
   wherein the conveyance apparatus is operable to determine an abnormality in a position of the transferred container by comparing a detected value of the upper end height of the transferred container, as detected by the sensor, with an expected value of the upper end height of the transferred container calculated on the basis of a height of the container that is handled.

4. The raising/lowering conveyance apparatus for an article conveying container according to claim 3, wherein:
   front and rear sets of container holders are provided so as to correspond to front and rear sides of the container;
   the front and rear sets of container holders include holding tools which hold a side surface of the container, and a pair of left and right positioning tools which are freely movable closer to or away from each other in a laterally horizontal direction and which are fitted to left and right corner portions of a side surface of the container so as to position the container; and
   one of the reflection-type photoelectric receptors is near the holding tool of one of the sets of container holders and another of the reflection-type photoelectric receptors is near the holding tool of the other set of container holders.

5. A raising/lowering conveyance apparatus for an article conveying container, comprising:
   at least two sets of container holders to hold an article conveying container from both sides so as to raise/lower the article conveying container, the container holders being operable to be raised/lowered in conjunction with each other and to be freely movable closer to or away from the container in a back-and-forth horizontal direction;

a sensor comprising a first reflection-type photoelectric receptor attached to a lower end of one of the at least two sets of container holders and a second reflection-type photoelectric receptor attached to a lower end of another of the at least two sets of container holders, the first reflection-type photoelectric receptor being operable to detect a first side upper end height of a transferred container when the first reflection-type photoelectric receptor clears an upper end of the transferred container and stops receiving light reflected from the transferred container, and the second reflection-type photoelectric receptor being operable to detect a second side upper end height of a transferred container when the second reflection-type photoelectric receptor clears an upper end of the transferred container and stops receiving light reflected from the transferred container; and wherein the conveyance apparatus is operable to determine an abnormality in a position of the transferred container by comparing a detected value of the first side upper end height of the transferred container, as detected by the first reflection-type photoelectric receptor, with a detected value of the second side upper end height of the transferred container, as detected by the second reflection-type photoelectric receptor.

6. The raising/lowering conveyance apparatus for an article conveying container according to claim 5, wherein:
   front and rear sets of container holders are provided so as to correspond to front and rear sides of the container;
   the front and rear sets of container holders include holding tools which hold a side surface of the container, and a pair of left and right positioning tools which are freely movable closer to or away from each other in a laterally horizontal direction and which are fitted to left and right corner portions of a side surface of the container so as to position the container; and
   the first reflection-type photoelectric receptor is attached to a position near the holding tool of one of the sets of container holders and the second reflection-type photoelectric receptor is attached to a position near the holding tool of the other set of container holders.

* * * * *